(No Model.)
C. H. B. SCHATZ.
HORSESHOE.
No. 438,952.  Patented Oct. 21, 1890.
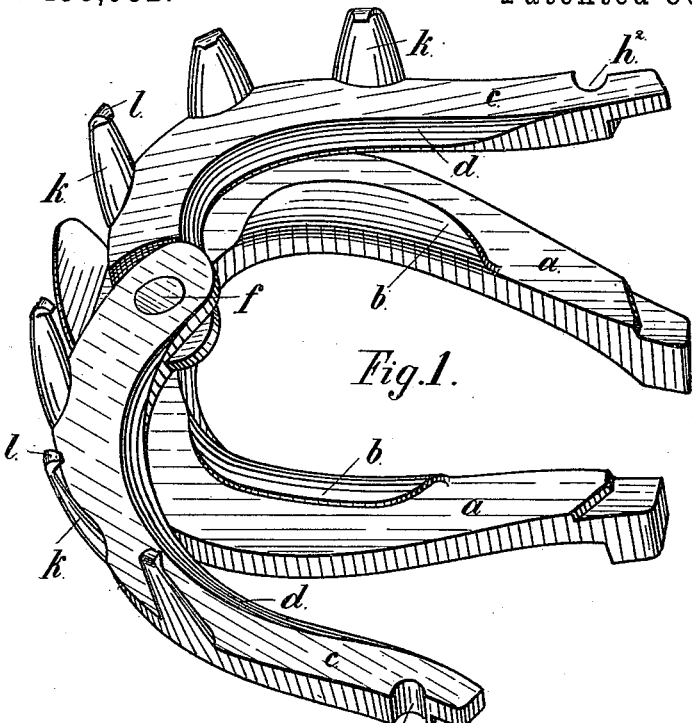
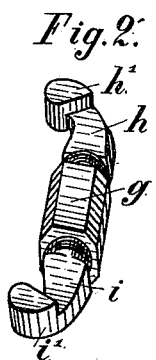
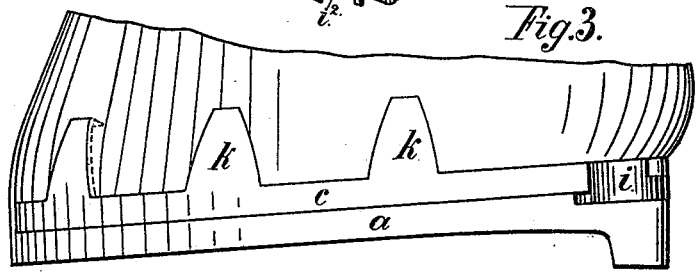
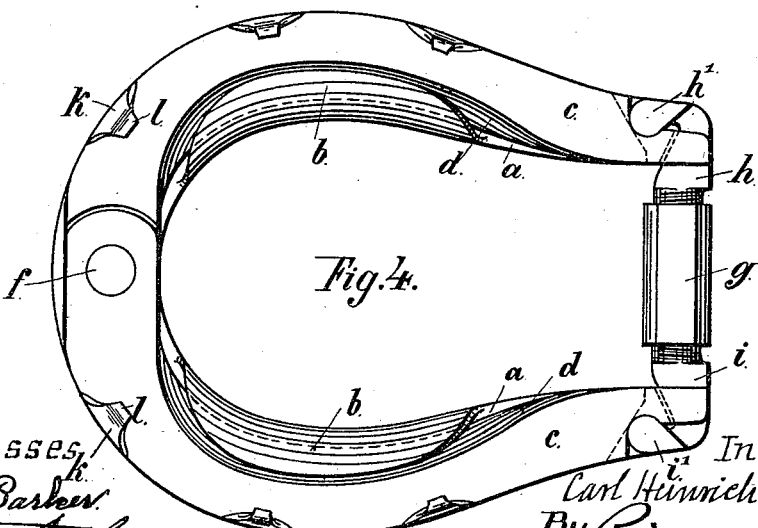
Witnesses:
J. R. Barker
J. Thastothran
Inventor:
Carl Hinrich B. Schatz
By Paine & Ladd
attys.

UNITED STATES PATENT OFFICE.

CARL HEINRICH BERNHARD SCHATZ, OF HAMBURG, GERMANY.

HORSESHOE.

SPECIFICATION forming part of Letters Patent No. 438,952, dated October 21, 1890.

Application filed May 8, 1890. Serial No. 350,969. (No model.)

*To all whom it may concern:*

Be it known that I, CARL HEINRICH BERNHARD SCHATZ, a subject of the German Emperor, and resident of Hamburg, in the German Empire, have invented certain new and useful Improvements in Horseshoes, of which the following is a specification.

This invention relates to improvements in shoeing horses and other beasts of draft, and the object of the same is to provide means for attaching the shoe to the hoof of the horse or cattle without using nails. I attain this object by means of a separate fastening device, which is designed after the manner of a pair of tongs or of a clamp, and which is adapted to simultaneously attach itself and a special interchangeable shoe to the hoof.

Referring to the accompanying drawings, Figure 1 is a perspective view of the improved fastening device and shoe in the position in which they may be attached to the hoop. Fig. 2 is a pair of right and left hand screw-bolts with nut for securing the fastening device to the hoof. Fig. 3 shows the under part of a hoof with attached shoe; and Fig. 4 is a top view of my improved fastening device and shoe, both rigidly clamped together.

Similar letters refer to similar parts throughout the several views.

The particular horseshoe $a$ is provided at the inner edge of both wings or branches with outwardly-splayed flanges $b$, which project from the upper face of the shoe to receive the fastening device. This latter consists of halves $c\ c$, which are hinged together at the toe by a bolt $f$, which is connected to the shoe at the toe thereof. At their upper inner edge $d$ the halves of the fastening device are beveled to correspond with the flanges $b$, under which they are adapted to engage as soon as the said halves $c\ c$ are drawn together at the heel ends of the shoe, which may be effected preferably by the aid of a pair of right and left handed screw-bolts $h\ i$, operated by a nut $g$ and adapted to engage with their projecting heads $h'\ i'$ into corresponding recesses $h^2\ i^2$ of the fastening device.

At their upper faces both wings of the fastening device are provided with a number of suitably-arranged projecting claws $k$, which serve to embrace the hoof into the outer horny layer of which they may be burned, so that by the aid of inwardly-projecting hooks $l$ of the claws $k$ a rigid connection of the fastening device to the hoof will be effected. When it is therefore desired to fix the shoe $a$ to the hoof, the unfolded fastening device, Fig. 1, is drawn together at the heel end by means of the nut $g$ of the screw-bolts $h\ i$ after the shoe has been placed in position, while for the purpose of replacing a worn shoe the latter can be easily detached from the hoof by unscrewing the nut $g$ from the screw-bolts.

To secure the fastening device with the shoe to the hoof, any nut-lock of known construction may be employed in connection with the screw-bolts and nut $g\ h\ i$.

Having fully described my invention, what I claim, and desire to protect by Letters Patent, is—

1. The combination of a horseshoe having at its inner edge outwardly-splayed flanges with a fastening device consisting of two wings hinged together at the toe and engaging simultaneously with the hoof and the shoe, substantially as set forth, said fastening device being pivoted to the toe of the shoe, as stated.

2. The combination of a horseshoe having at its inner edge outwardly-splayed flanges, a fastening device consisting of two wings hinged together at the toe and provided at their upper face with projecting claws to engage over the hoof, and a pair of right and left screw-bolts operated by a nut, substantially as and for the purpose set forth, said fastening device being pivoted to the toe of the shoe, as stated.

In testimony that I claim the foregoing as my invention I have signed my name, in presence of two witnesses, this 27th day of April, 1890.

CARL HEINRICH BERNHARD SCHATZ.

Witnesses:
DIEDRICH PETERSEN,
G. MÉGUIN, Jr.